Feb. 23, 1932.   W. R. MORRIS   1,847,017
INTERNAL COMBUSTION ENGINE
Filed July 25, 1930   2 Sheets-Sheet 1
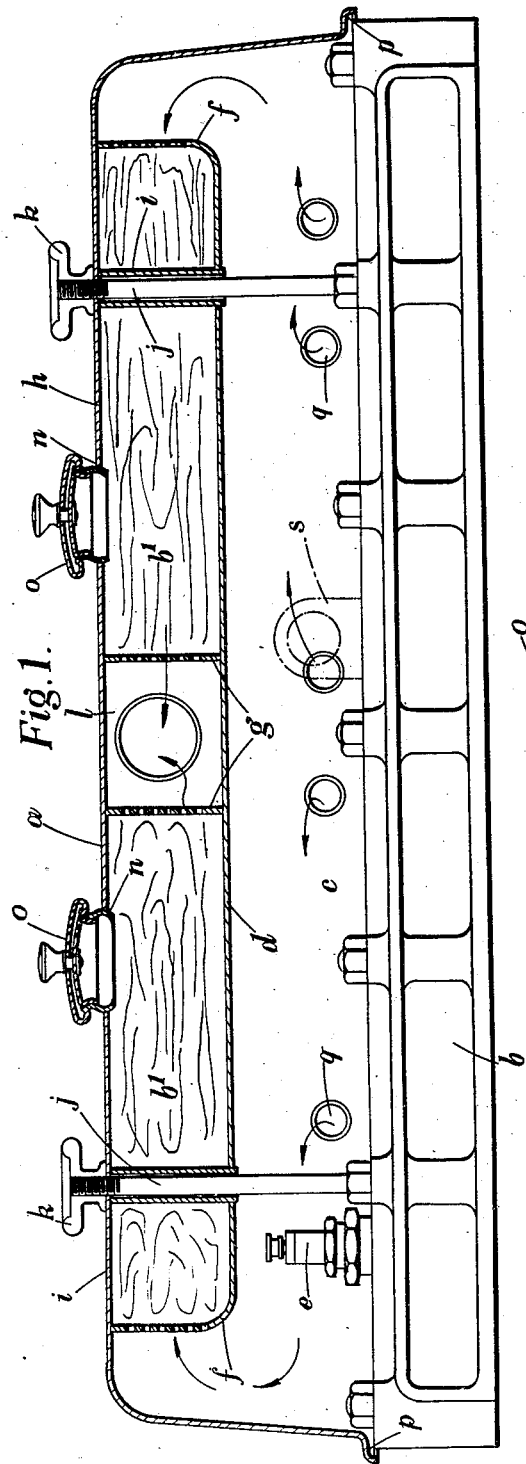
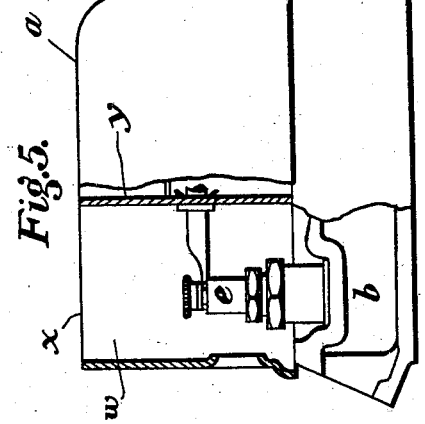
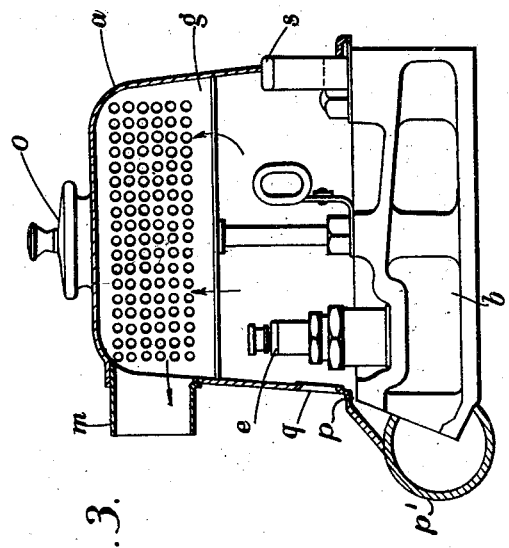
INVENTOR
William R. Morris,
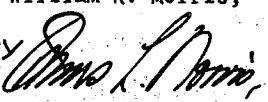
ATTORNEY Feb. 23, 1932.  W. R. MORRIS  1,847,017
INTERNAL COMBUSTION ENGINE
Filed July 25, 1930  2 Sheets-Sheet 2
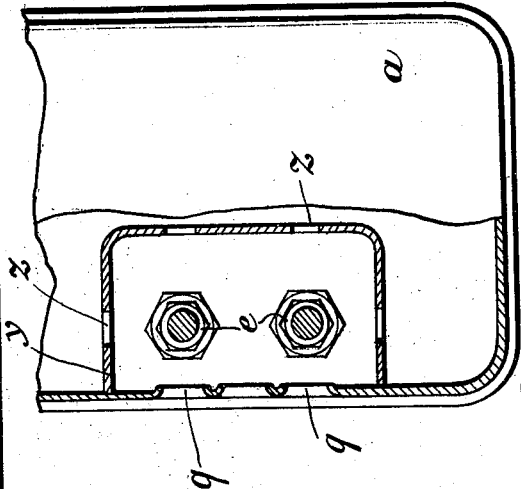
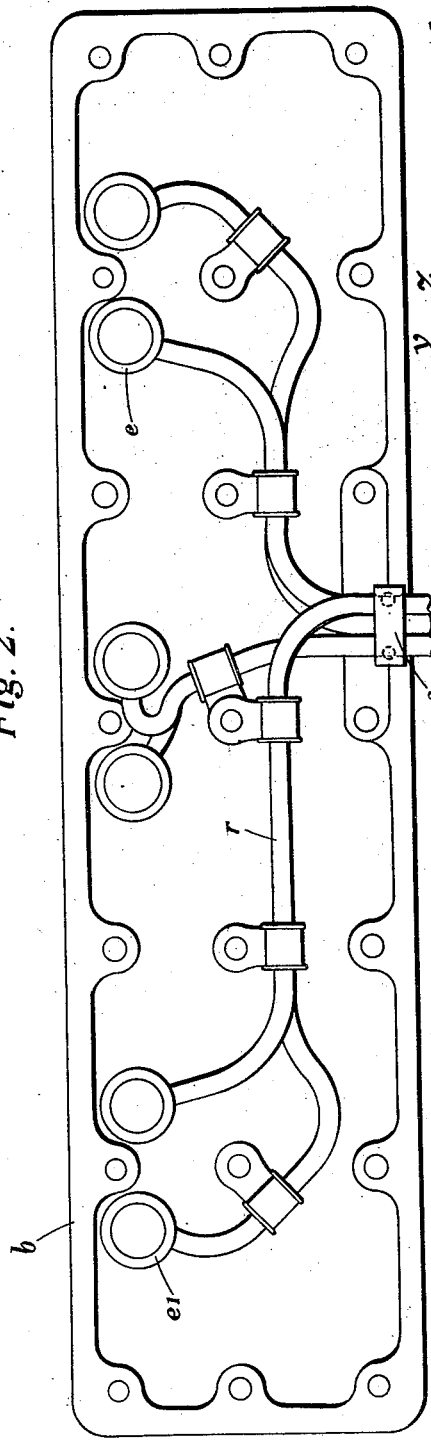
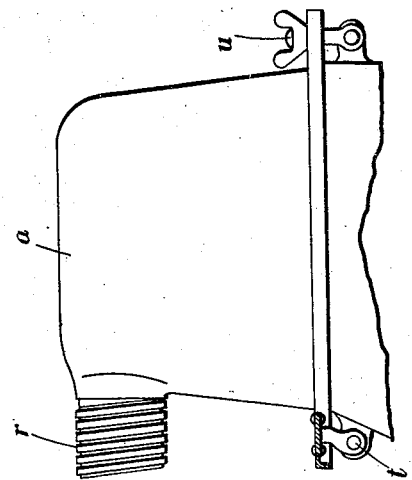
INVENTOR
William R. Morris,
BY
*James L. Norris,*
ATTORNEY Patented Feb. 23, 1932

1,847,017

UNITED STATES PATENT OFFICE

WILLIAM RICHARD MORRIS, OF COWLEY, ENGLAND

INTERNAL COMBUSTION ENGINE

Application filed July 25, 1930, Serial No. 470,730, and in Great Britain July 26, 1929.

This invention relates to internal combustion engines in which the cylinder head is provided with a detachable cover or enclosure through which combustion air is drawn, with the object of heating the air and cooling the cylinder head and is concerned more particularly with those which additionally provide for cleaning or filtering the air.

This invention consists in so combining the heating means and the cleaning or filtering means that the air is heated before it is cleaned.

A further feature of the invention is that the inlets to the enclosure are so arranged that the air impinging against the ignition plugs enters the enclosure directly from the atmosphere.

A further feature of the invention is that open topped shrouds or tunnels surround the ignition plugs to permit of access thereto while the enclosure is in position.

A further feature of the invention is that the filtering or cleaning means is disposed within the main enclosure.

A further feature of the invention is that two filters in parallel are provided in order to reduce air velocity through the filter.

A further feature of the invention is the provision of means whereby the heating and filtering cover or enclosure can be quickly detached.

A further feature of the invention is that the filter extends substantially the full length of the cover or enclosure, thus making it unnecessary to give attention to the filter except at infrequent intervals.

A further feature of the invention is that the heating and filtering enclosure may be formed as a sheet metal pressing.

In order that this invention may be clearly understood and readily carried into practice, the invention will be described with reference to the accompanying drawings in which :—

Fig. 1 is a sectional elevation of means for supplying air according to the present invention, only a single spark plug being shown.

Fig. 2 is a plan view of Fig. 1 with certain parts removed.

Fig. 3 is a transverse section at a right angle to Fig. 1 on the line 3—3, Figure 1.

Fig. 4 is an end view showing one means for securing the cover in position.

Fig. 5 is a view, partly in vertical section and partly in end elevation, of a cover embodying open-topped shrouds around the sparking plugs.

Fig. 6 is a view partly in horizontal section and partly in top plan of the cover shown in Fig. 5.

In one convenient embodiment of my invention as applied, for example, to an engine of the side valve type, with a four-cylinder or six-cylinder in line unit, a metallic chamber, container or enclosure $a$ is provided to seat on the cylinder head $b$ of an internal combustion engine. The said chamber, container or enclosure $a$ is conveniently divided into two parts $b^1$ $c$ by a horizontally arranged partition $d$, sufficient space being left between said partition and the cylinder head of the engine to clear the tops of the spark plugs $e$. Constructionally the chamber unit may be formed as a sheet metal pressing substantially rectangular in formation and having welded or otherwise secured thereto transverse partitions $f$ $g$ situated at the extremities and near the middle respectively. The ends $f$ may be integral with the horizontally arranged partition $d$ and the latter may be connected to the top wall $h$ of the chamber by tubuli $i$ which form tunnels through which the studs $j$ for securing the enclosure $a$ to the cylinder head of the engine pass, said studs carrying hand clamping nuts $k$ easily detachable to permit removal of the enclosure $a$ and to afford access to the sparking plugs. The transverse partitions $f$ $g$ are perforated to provide for passages of air, and the duct $l$ formed by the space between the two partitions $g$ communicates with an inserted stub pipe $m$ to which the pipe leading to the carburettor of the engine it attached. To permit of the introduction of the cleaning medium into the upper chambers $b^1$, apertures $n$ are formed in the top wall of the enclosure $a$ to accommodate removable plugs $o$, which for convenience may be made of pressed metal. A flange $p$ may be formed around the base of the enclosure $a$ for making an airtight joint with the cylinder head.

When provision is made for cooling the ignition plugs by means of the ingoing air, inlets for such air may be provided by forming apertures $q$ in the sides of the enclosure $a$ at positions in the vicinity of the sparking plugs and on the sides remote from the exhaust manifold. Access to the said plugs is provided by merely removing enclosure $a$, but for facilitating this operation, the cables or leads $r$ to the spark plugs $e$ may pass through a perforated support $s$ of horseshoe shape permanently secured in position and engaged by a similarly shaped slot in the enclosure $a$, whereby the latter may be withdrawn leaving the support and the leads in situ.

The cover or enclosure may be extended beyond the margin of the cylinder head to make metallic contact with the exhaust manifold, to extract heat therefrom as for example, by continuing the flange $p$ Fig. 3 to contact with the adjacent exhaust manifold $p^1$. As before mentioned, the upper part of the enclosure $a$ is adapted to function as an air cleaner, and for this purpose may include any known or suitable expedient by which suspended matter is removed from the ingoing air, such for example, as a series of vanes shaped and positioned to impart to the air current a rotary motion or we may employ horse hair or similar material oiled to present a surface to which the dust may adhere, a plurality of sections being if desired included to prevent packing of the cleaning material.

The enclosure $a$, instead of being secured in place as shown in Figures 1 and 3 may, as shown in Figure 4, be hingedly attached to the cylinder head by means of a pivot $t$ and may be held down by swinging clamping bolts $u$, the outlet being connected with the carburettor of the engine by means of a flexible pipe $r$.

In the arrangement illustrated, air passes through the inlet ducts $q$ in the lower compartment $c$ of the enclosure $a$ and is thus directed to impinge on to and cool the spark plugs; and is then admitted to the upper compartments $b^1$ through a suitable passage or passages, for example the perforations in the partitions $f$, after having, if desired, transversed a tortuous path by the inclusion of appropriate baffles and passes through the upper compartments $b^1$, in which the suspended matter is removed from the air. The warmed and cleaned air is then discharged through a suitable conduit $m$ to the air intake of the carburettor (not shown).

In the case of an overhead valve engine the usual cover may be extended upwardly and provided with a false bottom to provide a chamber or space to serve the same function as that described in connection with the side valve engine.

To obtain a low air velocity and at the same time preserve the cooling effect on the spark plugs, the inlet ducts $q$ may be truncated, conical or flared shape forming pendant air tunnels co-axial with and surrounding the spark plugs and terminating near the base of the latter. Such a construction is illustrated in Figs. 5 and 6 wherein a compartment $w$ is formed in the side of the cover to accommodate the sparking plug or plugs. In the case of a six-cylinder engine, for which the illustrated cover is suitable, one compartment may enclose two spark plugs, air inlets may be formed at $q$ as in Fig. 1 and air may also enter through the open top $x$ of the compartment. The compartment may be formed as a sheet metal U shaped pressing $y$ welded or otherwise secured in position, as shown in Figure 6. Exits $z$ may be formed around the perimeter of the compartment $w$ to allow air to pass into the lower compartment and thence through the filtering chamber in manner already described. Such a construction makes it possible to form the compartments $w$ of sufficient size to permit of the introduction of a spanner wrench for removing the plugs without removing the enclosure. The spark plug leads may be attached by passing through the open upper ends or through the side of the compartment $w$.

By our invention, the ingoing air may pass to the intake of the carburettor at a low velocity owing to the considerable area and volume available, so that noise emanating from the ingoing air is minimized. Further, the production of an air current in proximity to the cylinder head is beneficial in reducing the temperature of the cylinder head and of raising that of the air delivered to the carburettor and forming part of the combustible charge.

Having particularly described and ascertained the nature of my said invention and in what manner the same is to be performed, I declare that what I claim is:—

1. An internal combustion engine of the kind referred to having over the cylinder head a cover or enclosure provided with an inlet for admission of air adjacent the cylinder head and in which the air is heated and an air compartment in said enclosure through which the air passes after being heated.

2. An internal combustion engine having over the cylinder head an enclosure forming an air heater and provided with an inlet for admission of air directly from the atmosphere against the ignition plug and a compartment in said enclosure through which the air passes and in which it is cleaned after being heated.

3. In an internal combustion engine having an enclosure adapted to form an air heater-cleaner over the cylinder head, the provision of open-topped shrouds or tunnels around the ignition plugs to permit of access thereto while the enclosure is in position.

4. In an internal combustion engine, an enclosure over the cylinder head having an inlet and forming an air heater, and an air cleaning compartment disposed within said enclosure through which the air passes after being heated.

5. In an internal combustion engine, an enclosure over the cylinder head adapted to form an air heater-cleaner and having two filter chambers in parallel to reduce air velocity through the filter.

6. In an internal combustion engine, an enclosure over the cylinder head of the engine, and forming an air heater-cleaner, said enclosure being hingedly attached to the engine and secured by a quickly operable fastening.

7. In an internal combustion engine, an enclosure over the cylinder head adapted to form an air heater, and an air filter in said enclosure extending substantially the whole length of the enclosure and through which the air passes after being heated.

8. An internal combustion engine having an enclosure over the cylinder head adapted to form an air heater-cleaner and extended to the vicinity of the exhaust manifold or system.

9. In an internal combustion engine a pressed metal casing adapted to be applied to the cylinder head of said engine, a horizontal partition dividing the casing into two chambers, transverse partitions secured to said casing near the extremity and middle respectively, tubular members connecting the said horizontal partition with the ceiling of the casing, access apertures in the ceiling of the said casing, removable plugs in said apertures, and an outlet for air situated between the two middle transverse partitions, the parts being so arranged that air enters the lower part of the casing is there heated and then passes through the filtering medium in the upper chamber to an outlet connected to the carburetting system.

In testimony whereof I have signed my name to this specification at Birmingham, England this 15th day of July, 1930.

WILLIAM RICHARD MORRIS.